UNITED STATES PATENT OFFICE.

THOMAS HAROLD DURRANS, OF OXFORD, ENGLAND, ASSIGNOR TO A. BOAKE ROBERTS & CO., LIMITED, OF LONDON, ENGLAND.

MANUFACTURE OR PREPARATION OF SULFURYL CHLORID.

1,364,738.      Specification of Letters Patent.      Patented Jan. 4, 1921.

No Drawing.      Application filed May 28, 1918. Serial No. 237,106.

*To all whom it may concern:*

Be it known that I, THOMAS HAROLD DURRANS, a subject of the King of Great Britain, residing at 245 Woodstock road, Oxford, in the county of Oxford, England, have invented new and useful Improvements in the Manufacture or Preparation of Sulfuryl Chlorid, of which the following is a specification.

Sulfuryl chlorid ($SO_2Cl_2$) has been made by causing sulfur dioxid and chlorin to react under the influence of sunlight, or ultraviolet rays, or of pressure, or in the presence of camphor, charcoal, acetic acid, or acetic anhydrid, acting as catalysts, but these methods are difficult in manipulation and give but poor yields.

It has now been found that without the aid of light, or pressure, certain bodies, other than those aforesaid, will assist the reaction between sulfur dioxid and chlorin and the production of sulfuryl chlorid and have the advantages of being neutral in action, or but weakly acid, and of giving better yields by a process which is very simple and easily conducted.

The bodies which are so employed in accordance with this invention to assist the reaction are esters which are compounds of saturated aliphatic alcohols and of saturated aliphatic acids containing carbon, hydrogen, and oxygen, only, and also tri-phenyl phosphate, tri-cresyl-phosphate, eucalyptol, benzaldehyde and benzyl acetate.

The process for the preparation of sulfuryl chlorid may be carried out as follows: One, (or, if desired more than one,) of the hereinbefore defined bodies, employed in accordance with this invention, is, (or are), placed in any suitable reaction chamber, or vessel, which is then closed, and the sulfur dioxid and chlorin gas in molecular proportions (*i. e.*, in equal volumes) are passed into the said chamber, or vessel, and its contents, either together, or alternately, and either continuously, or intermittently. The temperature should be kept sufficiently low to prevent the catalyst and the formed sulfuryl chlorid from volatilizing, but sufficiently high to prevent the catalyst from solidifying. The sulfuryl chlorid which is formed as the result of the reaction can be isolated by distillation or other known, or suitable means, or, if desired, it can be used without being isolated, or purified, or it may be combined with, or added to, other bodies, or be caused to react therewith in any suitable way for the production of any particular compound which may be required.

What I claim is:—

1. The process of manufacturing sulfuryl chlorid which comprises the step of causing sulfur dioxid and chlorin to react in the presence of an ester compound of saturated aliphatic alcohol and of saturated aliphatic acid containing only carbon, hydrogen and oxygen.

2. The process of manufacturing sulfuryl chlorid which comprises the step of causing sulfur dioxid and chlorin to react in the presence of an ester compound of saturated aliphatic alcohol and of saturated aliphatic acid containing only carbon, hydrogen and oxygen and in the absence of light or pressure.

3. The process of manufacturing sulfuryl chlorid which comprises the step of passing sulfur dioxid and chlorin through an ester compound of saturated aliphatic alcohol and of saturated aliphatic acid containing only carbon, hydrogen and oxygen in a closed reaction vessel.

4. The process of manufacturing sulfuryl chlorid which comprises the step of passing sulfur dioxid and chlorin through an ester compound of saturated aliphatic alcohol and of saturated aliphatic acid containing only carbon, hydrogen and oxygen in a closed reaction vessel, and in the absence of light or pressure.

5. The process of manufacturing sulfuryl chlorid which comprises the step of causing sulfur dioxid and chlorin to react in the presence of an ester at a temperature below that of volatilization of the ester and the formed sulfuryl chlorid but above that at which the ester solidifies.

In testimony whereof I have signed my name to this specification in the presence of two subscribing witnesses.

THOMAS HAROLD DURRANS.

Witnesses:
    WILLIAM HOLMES,
    ROBERT HAROLD TURNER.